(12) United States Patent
Knollenberg et al.

(10) Patent No.: US 12,399,114 B2
(45) Date of Patent: Aug. 26, 2025

(54) MODULAR PARTICLE COUNTER WITH DOCKING STATION

(71) Applicant: PARTICLE MEASURING SYSTEMS, INC., Boulder, CO (US)

(72) Inventors: Brian A. Knollenberg, Boulder, CO (US); Edward Yates, Boulder, CO (US); Daniel Rodier, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 193 days.

(21) Appl. No.: 17/839,839

(22) Filed: Jun. 14, 2022

(65) Prior Publication Data

US 2022/0397519 A1 Dec. 15, 2022

Related U.S. Application Data

(60) Provisional application No. 63/287,030, filed on Dec. 7, 2021, provisional application No. 63/210,748, filed on Jun. 15, 2021, provisional application No. 63/210,776, filed on Jun. 15, 2021.

(51) Int. Cl.
*G01N 21/3504* (2014.01)
*G01N 21/39* (2006.01)

(52) U.S. Cl.
CPC ......... *G01N 21/3504* (2013.01); *G01N 21/39* (2013.01); *G01N 2021/396* (2013.01); *G01N 2201/06113* (2013.01); *G01N 2201/126* (2013.01)

(58) Field of Classification Search
CPC ............... G01N 21/3504; G01N 21/39; G01N 2021/396; G01N 2201/06113; G01N 2201/126
See application file for complete search history.

(56) References Cited

U.S. PATENT DOCUMENTS

| 2,915,939 A | 12/1959 | Luik |
| 2,956,435 A | 10/1960 | Rich |
| 4,594,715 A | 6/1986 | Knollenberg |
| 4,893,928 A | 1/1990 | Knollenberg |
| 5,026,155 A | 6/1991 | Ockovic et al. |

(Continued)

FOREIGN PATENT DOCUMENTS

| WO | 2020/102032 | 5/2020 |
| WO | WO 2020/225796 | 11/2020 |

(Continued)

OTHER PUBLICATIONS

U.S. Appl. No. 17/839,897, filed Jun. 14, 2022.

(Continued)

*Primary Examiner* — Jamil Ahmed
(74) *Attorney, Agent, or Firm* — Leydig Voit & Mayer, Ltd.

(57) ABSTRACT

Modular docking station and methods for sampling and monitoring gas and other fluids, where a sampling device is able to be removably attached to the docking station, thereby allowing the sampling device to be replaced without having to remove or disconnect the docking station from the rest of the sampling system. This allows the docking station to remain connected to the rest of the system with minimal or no interruption and reduces maintenance costs and time when replacing the sampling device.

29 Claims, 3 Drawing Sheets

(56) References Cited

U.S. PATENT DOCUMENTS

| | | |
|---|---|---|
| 5,072,626 A | 12/1991 | Ensor et al. |
| 5,084,629 A | 1/1992 | Petralli |
| 5,282,151 A | 1/1994 | Knollenberg |
| 5,283,199 A | 2/1994 | Bacon et al. |
| 5,671,046 A | 9/1997 | Knowlton |
| 5,675,405 A | 10/1997 | Schlidmeyer et al. |
| 5,726,753 A | 3/1998 | Sanberg |
| 5,751,422 A | 5/1998 | Mitchell |
| 5,805,281 A | 9/1998 | Knowlton et al. |
| 5,861,950 A | 1/1999 | Knowlton |
| 5,903,338 A | 5/1999 | Mavliev et al. |
| 6,167,107 A | 12/2000 | Bates |
| 6,275,290 B1 | 8/2001 | Cerni et al. |
| 6,615,679 B1 | 9/2003 | Knollenberg et al. |
| 6,709,311 B2 | 3/2004 | Cerni |
| 6,712,881 B2 | 3/2004 | Hering et al. |
| 6,829,044 B2 | 12/2004 | Liu |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,208,123 B2 | 4/2007 | Knollenber et al. |
| 7,235,214 B2 | 6/2007 | Rodier et al. |
| 7,456,960 B2 | 11/2008 | Cerni et al. |
| 7,667,839 B2 | 2/2010 | Bates |
| 7,719,683 B2 | 5/2010 | Ahn |
| 7,746,469 B2 | 6/2010 | Shamir et al. |
| 7,796,255 B2 | 9/2010 | Miller |
| 7,973,929 B2 | 7/2011 | Bates |
| 7,985,949 B2 | 7/2011 | Rodier |
| 8,109,129 B2 | 2/2012 | Gorbunov |
| 8,174,697 B2 | 5/2012 | Mitchell et al. |
| 8,194,234 B2 | 6/2012 | Hopke et al. |
| 8,208,132 B2 | 6/2012 | Huetter et al. |
| 8,427,642 B2 | 4/2013 | Mitchell et al. |
| 8,465,791 B2 | 6/2013 | Liu et al. |
| 8,711,338 B2 | 4/2014 | Liu et al. |
| 8,800,383 B2 | 8/2014 | Bates |
| 8,869,593 B2 | 10/2014 | Gorbunov et al. |
| 9,141,094 B2 | 9/2015 | Pariseau et al. |
| 9,157,847 B2 | 10/2015 | Pariseau et al. |
| 9,158,652 B2 | 10/2015 | Pariseau |
| 9,631,222 B2 | 4/2017 | Ketcham et al. |
| 9,638,665 B2 | 5/2017 | Gorbunov et al. |
| 9,808,760 B2 | 11/2017 | Gromala et al. |
| 9,810,558 B2 | 11/2017 | Bates et al. |
| 9,885,640 B2 | 2/2018 | Ketcham et al. |
| 9,989,462 B2 | 6/2018 | Lumpkin |
| 10,197,487 B2 | 2/2019 | Knollenber et al. |
| 10,228,316 B2 | 3/2019 | Bergmann et al. |
| 10,330,578 B2 | 6/2019 | Manautou et al. |
| 10,488,313 B2 | 11/2019 | Moenkemoeller |
| 10,520,414 B2 | 12/2019 | Avula et al. |
| 10,578,539 B2 | 3/2020 | Remiarz et al. |
| 10,792,694 B2 | 10/2020 | Gorbunov et al. |
| 10,859,487 B2 | 12/2020 | Knollenberg et al. |
| 10,914,667 B2 | 2/2021 | Avula et al. |
| 10,921,229 B2 | 2/2021 | Shamir |
| 10,928,293 B2 | 2/2021 | Knollenberg et al. |
| 10,983,040 B2 | 4/2021 | Pariseau |
| 10,997,845 B2 | 5/2021 | MacLaughlin et al. |
| 11,169,070 B2 | 11/2021 | Berger et al. |
| 11,181,459 B2 | 11/2021 | Oberreit |
| 11,215,546 B2 | 1/2022 | MacLaughlin |
| 11,231,345 B2 | 1/2022 | Scialo et al. |
| 11,237,095 B2 | 2/2022 | Rodier et al. |
| 11,255,760 B2 | 2/2022 | Scialo et al. |
| 11,268,930 B2 | 3/2022 | Rodier et al. |
| 11,320,360 B2 | 5/2022 | Lumpkin et al. |
| 11,385,161 B2 | 7/2022 | Bates et al. |
| 11,416,123 B2 | 8/2022 | Pandolfi et al. |
| 11,428,617 B2 | 8/2022 | Knollenberg et al. |
| 11,428,619 B2 | 8/2022 | Knollenberg et al. |
| 11,927,509 B2 | 3/2024 | Scialo et al. |
| 11,946,852 B2 | 4/2024 | Scialo et al. |
| 11,988,591 B2 | 5/2024 | Pariseau et al. |
| 11,988,593 B2 | 5/2024 | Ellis et al. |
| 12,231,890 B2 | 2/2025 | Michaelis et al. |
| 12,270,817 B2 | 4/2025 | Scialo et al. |
| 12,276,592 B2 | 4/2025 | Scialo et al. |
| 2004/0069046 A1 | 4/2004 | Sunshine et al. |
| 2008/0037004 A1 | 2/2008 | Shamir et al. |
| 2009/0009748 A1 | 1/2009 | Ahn |
| 2010/0212395 A1 | 8/2010 | Willett et al. |
| 2011/0203931 A1 | 8/2011 | Novosselov et al. |
| 2013/0227929 A1 | 9/2013 | Kulkarni et al. |
| 2015/0075301 A1 | 3/2015 | Scialo et al. |
| 2017/0241893 A1 | 8/2017 | Walls et al. |
| 2019/0262828 A1* | 8/2019 | Granier ............... G01N 21/01 |
| 2020/0072724 A1 | 3/2020 | Knollenberg et al. |
| 2020/0240896 A1 | 7/2020 | Karasikov et al. |
| 2021/0025806 A1 | 1/2021 | Pariseau et al. |
| 2021/0044978 A1 | 2/2021 | Michaelis et al. |
| 2021/0088437 A1 | 3/2021 | Pariseau et al. |
| 2021/0136722 A1 | 5/2021 | Scialo et al. |
| 2021/0208054 A1 | 7/2021 | Ellis et al. |
| 2021/0223273 A1 | 7/2021 | Scialo et al. |
| 2021/0356374 A1 | 11/2021 | Han |
| 2021/0381948 A1 | 12/2021 | Rodier et al. |
| 2022/0228963 A1 | 7/2022 | Shamir |
| 2022/0397495 A1 | 12/2022 | Yates et al. |
| 2022/0397510 A1 | 12/2022 | Yates et al. |
| 2023/0009668 A1 | 1/2023 | Scialo et al. |
| 2023/0087059 A1 | 3/2023 | Knollenberg et al. |
| 2023/0236107 A1 | 7/2023 | Moghaddam et al. |
| 2024/0027326 A1 | 1/2024 | Karasikov et al. |
| 2024/0133793 A1 | 4/2024 | Ellis et al. |
| 2024/0159787 A1 | 5/2024 | Scialo et al. |
| 2024/0183759 A1 | 6/2024 | Scialo et al. |
| 2024/0219412 A1 | 7/2024 | Scialo et al. |
| 2024/0264066 A1 | 8/2024 | Knollenberg |
| 2024/0426736 A1 | 12/2024 | Pariseau et al. |

FOREIGN PATENT DOCUMENTS

| | | |
|---|---|---|
| WO | WO 2020/232167 | 11/2020 |
| WO | 2021/176238 | 9/2021 |

OTHER PUBLICATIONS

U.S. Appl. No. 17/839,565, filed Jun. 14, 2022.

International Search Report and Written Opinion, dated Sep. 27, 2022, corresponding to International Application No. PCT/US202233367, 10 pp.

Extended European Search Report, dated Apr. 4, 2025, issued in corresponding European Application No. 22 82 5637.

* cited by examiner

MODULAR PARTICLE COUNTER WITH DOCKING STATION

CROSS-REFERENCE TO RELATED APPLICATIONS

This application claims the benefit of priority to U.S. Provisional Patent Application No. 63/287,030, filed Dec. 7, 2021, 63/210,776, filed Jun. 15, 2021, and 63/210,748, filed Jun. 15, 2021, each of which is hereby incorporated by reference in its entirety.

BACKGROUND OF THE INVENTION

This invention is generally in the field of devices used to sample and analyze gases and other fluids, including collecting samples for the detection of particles and other contaminants in a range of cleanroom and manufacturing environments.

Monitoring gas and fluid streams in order to determine the composition of the gas or fluid and to detect the presence of particles and microorganisms is of great importance in various industries. For example, in pharmaceutical and semiconductor manufacturing the presence of particles or undesired components in the environment can detrimentally affect the manufacturing process and run afoul of regulatory requirements. As a result, cleanrooms, clean zones, and clean environments such as those where hazardous, toxic, or flammable materials are present, are commonly used in semiconductor and pharmaceutical manufacturing facilities. For the semiconductor industry, an increase in airborne particulate concentration can result in a decrease in fabrication efficiency, as particles that settle on semiconductor wafers will impact or interfere with the small length scale manufacturing processes. For the pharmaceutical industry, contamination by airborne particulates and biological contaminants puts pharmaceutical products at risk for failing to meet standards established by the US Food and Drug Administration (FDA) and other foreign and international health regulatory agencies.

Standards for the classification of cleanroom particle levels as well as for testing and monitoring to ensure compliance are provided by ISO 14664-1 and 14664 2. Similarly, ISO 14698-1 and 14698-2 provide standards for the evaluation of cleanroom and clean zone environments for biocontaminants. To meet these and other standards, particle counters and other sampling devices are commonly used to determine airborne particle levels and to detect contaminants in cleanrooms, clean zones and clean environments.

However, such devices frequently need to be replaced and routinely calibrated as the result of prolonged use, system failures, and for general maintenance. Especially in cleanroom and clean zone environments, replacing such devices incur significant costs in terms of time and other resources. While installing the new device, care must be taken so as not to contaminate the cleanroom or clean zone environment, and once replaced, the new device will typically need to be integrated with the rest of the system. Additionally, repeated replacement of the device will cause other parts in the system to also wear out, such as through the repeated disconnecting and reconnecting of cables, wires, gas and fluid lines, and other pieces of equipment. Moreover, often only a single component of the device will need to be replaced. For example, in detectors that utilize a laser sensor, the laser component will often wear out more quickly than the other components.

Accordingly, what is needed is a system for replacing components of particle counters and other sampling devices that allows for safer, faster and more economical replacement of the desired components.

SUMMARY OF THE INVENTION

The present invention provides modular systems and methods for sampling and monitoring gas and other fluids, where components of the sampling system are able to be detached from one another thereby allowing at least one component of the sampling system to be replaced without having to remove or disconnect other components. This allows other components of the sampling system to remain connected to the rest of the system with minimal or no interruption and reduces maintenance costs and time when replacing the sampling device.

In one aspect, the present invention provides a docking station that is able to attach to a sampling device and provide one or more connections necessary to operate the sampling device, including but not limited to providing a connection to a power source, fluid flow source, and/or data communication network. Preferably, the sampling device comprises a component that is to be replaced due to routine calibration, contamination, system failure, deterioration, mechanical fatigue, in order to upgrade the system, in order to perform a different measurement, or to provide functional enhancements via firmware updates in a location with restricted network access for security reasons. The sampling device is detached from the docking system and replaced with a new sampling device, where attaching the new sampling device to the docking station establishes the necessary connections to operate the new sampling device. Over time, multiple sampling devices are able to be replaced and attached to the docking station without having to remove the docking station or reconnect the docking station to other components of the system other than the sampling devices. Being able to replace the sampling devices without having to also remove the docking system allows for easier installment of the sampling devices and reduces the need to reconfigure or reset the other components of the system.

In an embodiment, the present invention provides a docking station comprising: a base able to be removably attached to a body of one or more sampling devices; a power supply having a power input and a power output, wherein the power output is able to provide power to operate the sampling device; at least one fluid connector able to be attached to a fluid system, wherein the at least one fluid connector is able to provide a fluid flow to or through the sampling device; and at least one data communications connector able to be connected, wirelessly and/or through a wired connection, to an external controller or central processing unit (CPU), wherein the at least one data communications connector is able to transmit and receive electronic data to and from the controller or CPU. Preferably, the docking station is part of a fluid sampling system in a cleanroom, clean zone or clean environment.

As used herein, a sampling device is any device used to collect, sample, monitor, or analyze a gas or other fluid, particularly in a cleanroom, clean zone or clean environment. Examples of suitable sampling devices include, but are not limited to, particle counters, condensation particle counters, gas or other fluid analyzers, particle analyzers, particle samplers, gas, air or liquid sampling manifolds, molecular samplers, microorganism collection plates, microorganism collection impingers, real-time microbial detectors, environmental or gas sensors, and combinations thereof. The sampling devices used herein include devices used for continuous batch sampling as well as discrete sampling. A first sampling device is attached to the docking station and is subsequently replaced by a second sampling device. This process may be repeated multiple times so that the docking station is subsequently attached to a third sampling device, preferably a fourth sampling device, preferably a fifth sampling device, preferably a tenth sampling device, preferably a fifteenth sampling device, preferably a twentieth sampling device, or more. Optionally, the docking station further comprises one or more snap fit connectors or latches able to interact with one or more portions of the sampling devices in order to removably attach the base to the sampling devices.

As used herein, the power supply comprises a power input able to be connected to a power source, such as a standard electrical power source, power provided through Ethernet connections, and power provided through USB (Universal Serial Bus) cables and ports. The power supply may comprise a physical connecter, wireless power transfer (including but not limited to inductively coupled power transfer between the base and sampling device), or a combination of both. In an embodiment, the power supply is a wireless power supply able to wirelessly provide power to the sampling device. The power input of the docking station is connected to the power source upon installation of the docking station, but does not need to be disconnected when a sampling device is detached from the docking station and replaced. When a sampling device, such as a first, second or subsequent sampling device, is attached to the docking station, the power output of the docking station links with the sampling device so as to provide power to operate the sampling device.

The fluid flow comprises the target fluid that is to be sampled, monitored, and/or analyzed by the sampling device. The fluid system includes the pathway used to deliver the target fluid from the environment to the sampling device, and is able to provide a positively or negatively pressurized fluid flow. For example, in an embodiment, the fluid connector is a vacuum connecter and the fluid system comprises a vacuum source. In an alternative embodiment, the fluid system comprises a pump that provides a positive pressure to push the target fluid through the pathway to the sampling device. When a sampling device, such as a first, second or subsequent sampling device, is connected to the docking station, the fluid connector is able to be connected to and provide a fluid flow to the sampling device.

In an embodiment, the docking station is able to provide variable fluid flow rates through the fluid pathway and to the sampling device. For example, the docking station is able to provide a different fluid flow rate for different sampling devices having different flow rate requirements. This can be particularly beneficial if the sampling devices are different types of devices (such as a condensation particle counter and a microorganism collection plate) and/or are sampling different fluids. The different sampling devices may be connected to the docking station and operational simultaneously or at different times. Additionally, the variable flow rate may be used to perform a purge or flush operation where an elevated flow rate can be used to flush the system. The purge or flush operation can be useful when performing system changes which may cause artificially high levels of contamination, such as switching to sample a new fluid, switching to sample a fluid from a different source, replacing tubing, and replacing sampling devices.

The at least one data communications connector is able to provide a pathway for data to and from the sampling devices. The data communications connector may be a wireless connector, part of a wired connection, or a combination of both. Types of wireless communications able to transmit data to and from the sample devices include, but are not limited to, mobile communications, wireless network communications, Bluetooth communications, and infrared communications. The data able to be transmitted to and from the sample devices includes, but is not limited to, an internet protocol address and/or location setting of the sampling device, one or more settings or instructions from the external controller or CPU for operating the sampling device, current status of the sampling device, and sensor or detector results from the sampling device. Preferably, the internet protocol address, location setting, one or more operational settings, and combinations thereof are the same for the first sampling device and second sampling device and any subsequent sampling devices. In an embodiment, the data communications connector comprises an analog input/output connection, a digital input/output connection, an ethernet switch connection, a wireless communication connection, or any combination thereof. The controller and CPU can be any controller or computer processor able to operate the sampling device and/or receive and analyze data generated by the sampling device. In an embodiment, the CPU is able to combine data obtained from different time periods and/or multiple sampling modules to analyze the readings and generate reports. For example, the CPU can monitor and compare results before and after a fluid is passed through a filter to determine the filter removal efficiency. Additionally, the CPU can create an electronic log of events, such as when and under what conditions a contaminant was detected.

Optionally, the docking station also comprises a computer processor, flash memory, computer memory, or other data storage device, able to store electronic information related to the sampling devices. Such information includes, but is not limited to, one or more operational settings for operating the sampling device, or display settings showing the operational status of the sampling device. Such information may be pre-installed on the docking station before being connected to the system, or the information may be transmitted to the docking station during operation through the data communications connector.

In an embodiment, the docking station comprises, or is attached to an interface display system, such as a graphical user interface (GUI), that is able to display the operational status of the sampling device and, optionally, allow a user to select settings and control the operation of the docking station and sampling devices. Optionally, the operational status of the sampling device comprises one or more of the: flow status through one or more portions of the fluid sampling system, communication status, on/off or actively sampling vs. not sampling, laser sensor/detector status, calibration status, warmup status, alarm status (e.g., thermal state not reached or exceeded, high voltage power supply failure, or any parameter outside of normal specifications), contamination level alarm, or combinations thereof. The interface display system may be located on the docking station itself, or may be located remotely from the docking station and be connected to the docking station through the data communication connection.

Additionally, the docking station itself optionally comprises a detector or sensor able to detect or sense one or more specific components, microorganisms, or particles in the fluid flow. For example, in an embodiment, the docking station comprises a laser detector or laser sensor able to detect particles, microorganisms, airborne molecular contaminants, or other specific components in the fluid sample.

In an embodiment, the detector or sensor is a photonic detector, a sensor incorporating coherent light sources (e.g., LASER) and/or non-coherent light sources. Alternatively, the detector or sensor is a non-optical detector or sensor, including but not limited to detectors and sensors used to measure temperature, pressure, flow rate, and detectors and sensors used with chromatography, ion mobility spectrometry (IMS), and other spectrometry methods.

In an embodiment, the power output and/or at least one fluid connector are able to be connected to a second device while the docking station is attached to the sampling device and are able to additionally provide power and/or fluid flow to operate the second device. The second device may be an additional sampling device, such as a particle counter, condensation particle counter, gas or other fluid analyzer, particle analyzer, particle sampler, gas, air or liquid sampling manifold, molecular sampler, microorganism collection plate, environmental or gas sensor, and combinations thereof. For example, the sampling device may be a particle sampler or fluid sampling manifold and the second device may a particle counter or particle analyzer, where the sampling device is expected to need replacement before the second device. Alternatively, the second device is a device other than a sampling device, including but not limited to alarm indicators (e.g., a light tower alarm indicator) or devices able to provide information on the surrounding environment or collected samples (e.g., cameras, thermometers, pressure readers, electrostatic classifiers). Preferably, the data communications connector is additionally able to be connected, wirelessly and/or through a wired connection, to the second device so that the data transmitted to the controller or CPU comprises data from the sampling device, the second device, or both.

Optionally, a docking station may be used with two or more types of sampling devices within the same process, such as a sampling manifold that collects a gas or other fluid and a particle counter used to detect particles within the sampled gas or other fluid. For example, a separate docking station may be used for each sampling device, or a single docking station may be able to attach to two or more sampling devices simultaneously, where each sampling device may be detached and replaced independently of the other sampling device.

In an embodiment, the docking station is able to attach to multiple sampling devices, either simultaneously or at times independent from one another, and provide the connections necessary to independently operate each sampling device. The multiple sampling devices may sample the same or different fluids. For example, one sampling device may sample air or a gas while another sampling device may sample a liquid. Each sampling device may be replaced independently from the other sampling devices.

In an embodiment, the present invention provides an integrated fluid sampling system comprising one or more sampling devices able to sample a target fluid from an environment; and a modular docking station removably attached to the sampling device. The docking station comprises: i) a power supply having a power input connected to a power source and also having a power output, wherein the power output is removably connected to the one or more sampling devices and provides power to operate the one or more sampling devices; ii) at least one fluid connector able to be attached to a fluid system, wherein the at least one fluid connector is removably connected to the sampling device and provides a flow of the target fluid to or through the one or more sampling devices; and iii) at least one data communications connector connected to a controller or CPU, wherein the at least one data communications port transmits and receives electronic data to and from the controller or CPU. The at least one data communications connector may be connected wirelessly, as part of a wired connection, or a combination of both. Preferably, the target fluid is sampled from a cleanroom, clean zone, clean environment or a filtered fluid source. In an embodiment, the target fluid is sampled from a pressurized gas or liquid sample line, including but not limited to sub atmospheric pressure lines used to transport electronic specialty gases which are highly toxic and/or pyrophoric.

The docking station and devices of the fluid sampling system are the same as described above. A first sampling device is attached to the docking station and is subsequently replaced by at least a second sampling device and preferably additional subsequent sampling devices. The first sampling device, second sampling device, and any subsequent sampling device, independently of one another, is preferably a particle counter, condensation particle counter, gas or other fluid analyzer, particle analyzer, particle sampler, gas, air or liquid sampling manifold, molecular sampler, microorganism collection plate, environmental or gas sensor, and combinations thereof.

Optionally, the fluid sampling system comprises a second device in addition to the sampling device attached to the docking station, where the power output is removably connected to the second device and provides power to operate the second device, and the fluid connector is able to transport the target fluid from the sampling device to the second device. Additionally, the data transmitted to the controller or CPU through the data communications connector, wirelessly and/or through a wired connection, comprises data from the sampling device, the second device, or both.

In an embodiment, the present invention provides a method for operating a fluid sampling system comprising the steps of: a) providing a first sampling device and a modular docking station removably attached to the first sampling device; b) sampling target fluid from an environment using the first sampling device; c) detaching the first sampling device from the docking station, power outlet and fluid connecter, and connecting a second sampling device to the docking station, power outlet and fluid connecter; and d) sampling target fluid from the environment using the second sampling device. Preferably, the docking station is positioned in a cleanroom and remains in substantially the same location during the sampling steps and detaching step.

In a further embodiment, the method comprises generating data from the sampled fluid, operation of the sampling devices, or combinations thereof, and transmitting the generated data from the docking station to the controller or CPU. The received data is used to alter the operation of the sampling device, or is analyzed by the CPU to indicate the presence particles or microorganisms, to detect specific components in the gas or other fluid, or combinations thereof.

The docking station and devices of the fluid sampling system may be the same as described above. For example, in an embodiment, the docking station comprises:

i) a power supply having a power input connected to a power source and also having a power output, wherein the power output is removably connected to the first sampling device and provides power to operate the sampling device;

ii) a fluid connector able to be attached to a fluid system and provide a fluid flow to or through the first sampling device, wherein the fluid connector is removably connected to the first sampling device; and iii) a data communications connector connected to a controller or CPU, wherein the data communications connector transmits and receives electronic data to and from the controller or CPU. The data communications connector may be connected wirelessly, as part of a wired connection, or a combination of both. Preferably, the first sampling device, second sampling device, and any subsequent sampling device, independently of one another, is preferably a particle counter, condensation particle counter, gas or other fluid analyzer, particle analyzer, particle sampler, gas, air or liquid sampling manifold, molecular sampler, microorganism collection plate, environmental or gas sensor, and combinations thereof.

In a further embodiment, the method further comprises detaching the second sampling device from the docking station, power outlet and fluid connecter, and connecting a third sampling device to the docking station, power outlet and fluid connecter; and sampling target fluid from the environment using the third sampling device. Preferably, this method is repeated multiple times so that the third or subsequent sampling device is detached from the docking station, power outlet and fluid connecter, and a fourth or subsequent sampling device is attached. This method may be repeated multiple times so that the docking station is subsequently attached to a fifth sampling device, preferably a tenth sampling device, preferably a fifteenth sampling device, preferably a twentieth sampling device, or more.

While the docking stations and sampling devices are preferably positioned in a cleanroom, clean zone, or clean environment the docking stations and sampling devices may be positioned in other environments outside of a cleanroom, clean zone or clean environment. For example, the docking station and sampling devices may be placed inside a tool or piece of equipment, inside a high purity water system, or even outdoors. In an embodiment, the docking stations and sampling devices are part of a mobile sampling system.

DETAILED DESCRIPTION OF THE INVENTION

Definitions

Figure 1:
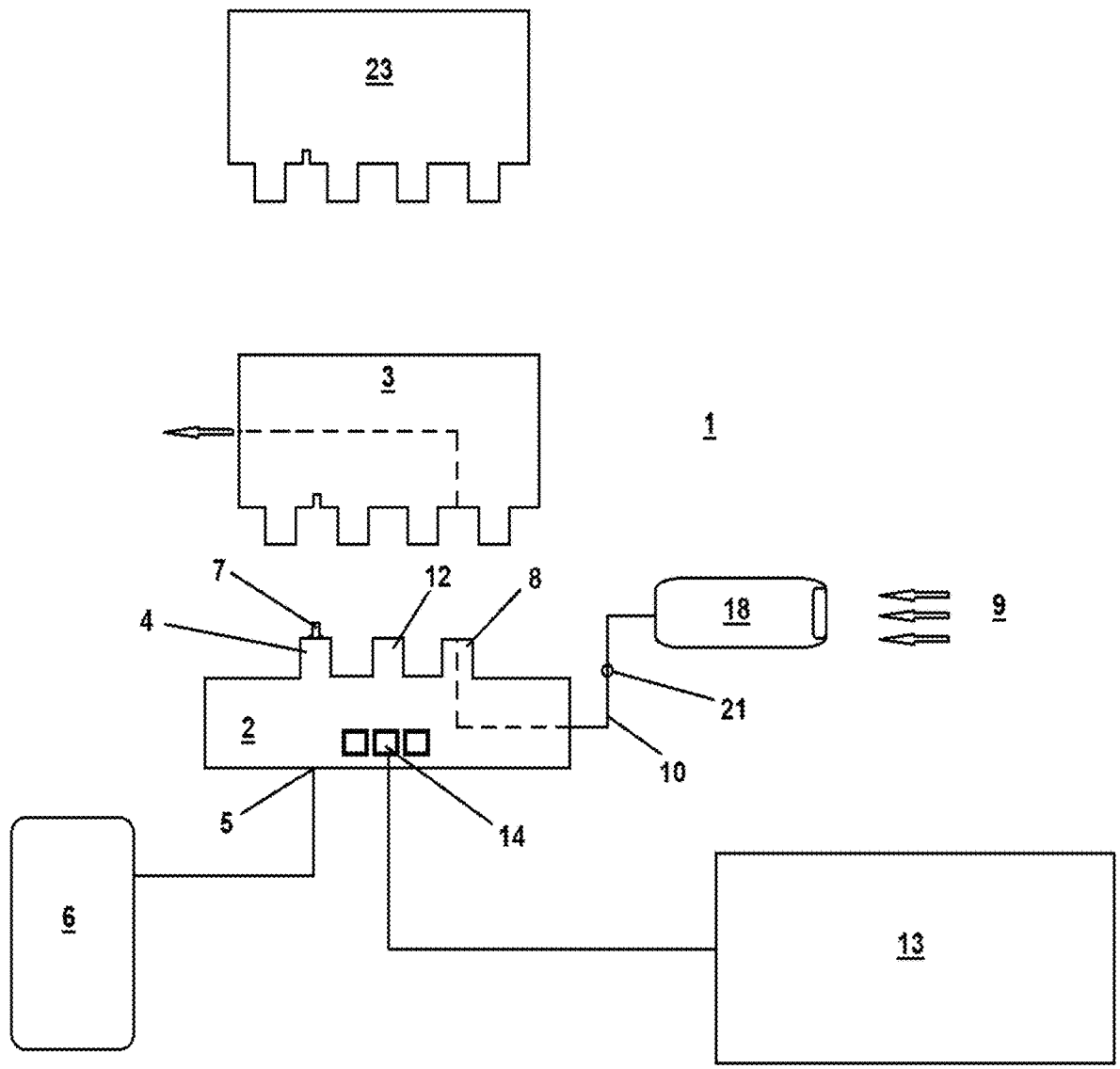
FIG. 1 shows a simplified illustration of an integrated fluid sampling system in an embodiment of the invention comprising a docking station and sampling devices able to be attached to the docking station.

In general, the terms and phrases used herein have their art-recognized meaning, which can be found by reference to standard texts, journal references and contexts known to those skilled in the art. The following definitions are provided to clarify their specific use in the context of the invention.

As used herein, the term "fluid" refers to a substance, such as a gas or liquid, that is capable of flowing and/or that is able to change its shape to conform to the dimensions of a container.

As used herein, the term "contaminant" or "contaminants" refers to a physical, chemical, or biological substance, impurity, or material, other than the intended products or components, that interfere with the manufacture of a desired product, or that present an actual or potential health or safety hazard. Contaminants include, but are not limited to, particles, gasses, non-volatile residues, and organic, molecular, and ionic compounds.

The term "particle" or "particles" refers to small objects which are often regarded as contaminants. A particle can be, but need not be, any material created by the act of friction, for example when two surfaces come into mechanical contact and there is mechanical movement. Particles can be single components, or composed of aggregates of material, such as dust, dirt, smoke, ash, water, soot, metal, oxides, ceramics, minerals, or any combination of these or other materials or contaminants. "Particle" or "particles" may also refer to biological particles, for example, viruses, spores, or microorganisms including bacteria, fungi, archaea, protists, or other single cell microorganisms. In some embodiments, for example, biological particles are characterized by a size dimension (e.g., effective diameter) of 1 nm and greater, preferably less than 100 nm, less than 50 nm, less than 20 nm, less than 10 nm, less than 7 nm, less than 5 nm, or less than 3 nm. A particle may refer to a small object which absorbs, emits or scatters light and is thus detectable by a particle counter or an optical particle counter. As used herein, "particle" or "particles" is intended to be exclusive of the individual atoms or molecules of a carrier fluid or sample medium, for example, water, air, process liquid chemicals, process gases, nitrogen, oxygen, carbon dioxide, etc. In some embodiments, particles may be initially present on a surface, such as a tool surface in a microfabrication facility or production surface in a pharmaceutical fabrication facility, liberated from the surface and subsequently analyzed in a fluid.

As used herein, the term "controller" refers to a hardware device, software program, or combination thereof, able to manage or direct the exchange of data, including operating instructions, between two components. In certain embodiments, a controller is able to operate one or more components of a fluid sampling system, such as a sampling device and/or docking station. Additionally, the controller is able to receive, analyze, and/or transmit data generated by one or more components of the fluid sampling system.

As used herein, the terms "processor" and "central processing unit (CPU)" refer to an electronic circuit or component that performs the calculations and basic instructions that drive a computer or other electronic device. The term "computer memory" refers to a device or system that is used to store data or programs for use by a processor. The term "flash memory" refers to an electronic non-volatile computer memory that can be electrically erased and reprogrammed.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When disclosing numerical values herein, for example, 1, 2, 3, 4, 5, 6, 7, 8, 9, 10, any of the foregoing numbers can be used singly to describe a single point or an open-ended range, or can be used in combination to describe multiple single points or a close-ended range. This sentence means that each of the aforementioned numbers can be used alone (e.g., 4), can be prefaced with the word "about" (e.g., about 8), prefaced with the phrase "at least about" (e.g., at least about 2), prefaced with the phrase "at least" (e.g., at least 10), prefaced with the phrase "less than" (e.g., less than 1), prefaced with the phrase "less than about" (e.g., less than about 7), or used in any combination with or without any of the prefatory words or phrases to define a range (e.g., 2 to 9, about 1 to 4, at least 3, 8 to about 9, 8 to less than 10, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats may be disclosed herein, but the difference in formats should not be construed to imply that there is a difference in substance.

As used herein, the terms "approximately" and "about" means that slight variations from a stated value may be used to achieve substantially the same results as the stated value. In circumstances where this definition cannot be applied or is exceedingly difficult to apply, then the term "about" means a 10% deviation (plus or minus) from the stated value.

Overview

In the following description, numerous details of the system, system components, and methods in certain embodiments of the present invention are set forth in order to provide a thorough explanation of the precise nature of the invention. It will be apparent, however, to those of skill in the art that the invention can be practiced without these specific details.

Aspects of the invention as described in the examples below provide a modular docking station able to be removably attached to a sampling device. In these examples, the docking station is connected to the power supply, fluid pathway, and communications network necessary to operate the sapling device. Connecting the sampling device to the docking station links the sampling device to the power supply, fluid pathway, and communications network through the docking station. When the sampling device is removed and replaced, the new sampling device links to the power supply, fluid pathway, and communications network through the docking station without having to disconnect the power supply, fluid pathway, and communications network from the docking station. The docking station allows for fast service interval swapping of different sampling devices with as minimal user interaction as possible.

Moreover, using the docking station means that the components of the fluid system will have to be reset or recalibrated less often when the sampling device is replaced. For instance, the docking station is able to provide a constant device location, IP address, and communication pathway that does not change when a new sampling device is attached.

Aspects of the invention can be further understood by the following non-limiting examples and figures.

EXAMPLES

Example 1

Integrated Fluid Sampling System

As illustrated in FIG. 1, a fluid sampling system 1 in one embodiment of the present invention comprises a docking station 2 that slides into, or otherwise attaches to, the sampling device 3 and may be used as a common component between the sampling device 3 and the other components of the fluid system 1.

The docking station 2 has a power connector 4 which comprises a power input 5, which is able to connect to a power source 6, and a power output 7, which is able to form an electrical link with the sampling device 3. Electrical power is provided to the sampling device 3 from the power source 6 through the power input 5 and power output 7.

The docking station 2 also has a fluid connector 8, which is connected to a fluid pathway 10. Fluid, such as air or liquid from a target environment 9, is transported through the fluid pathway 10 to the fluid connector and into the sampling device (as indicated by the arrows and dashed lines). In this embodiment, the sampling device 3 can be a gas or fluid analyzer or a particle counter that monitors and/or analyzes the fluid traveling through the sampling device 3.

In FIG. 1, the fluid is collected using a secondary device 18 and is transported to the docking station through the use of a pump 21, which provides a positive pressure. Alternatively, the pump is a compression pump (such as the Particle Measuring Systems CLS-700 product). Additionally, the pump may be installed on the outlet of sampling device 3, or may be connected to docking station 2 electrically and connected to the outlet of sampling device 3 pneumatically. The fluid pathway 10 leading to the docking station 2 does not have to altered or reconnected when the sampling device 3 is replaced by a second (or replacement) sampling device 23.

The docking station 2 also has a data communications connector 12 that is able to transmit data between the sampling device 3 and a controller/CPU 13. In this example, the controller/CPU 13 is a computer programmed to send operating instructions to the sampling device 3 in accordance with the desired sampling procedure to be performed. Additionally, if a particle or specified component of the gas or fluid is detected by the sampling device 3, an electrical signal is generated and transmitted to the controller/CPU 13.

The data communications connector 12 may contain multiple data ports 14 for transmitting data to and from the data communications connector 12, including but not limited to an analog or digital input/output, port for a data or USB cable, or an ethernet switch. Additionally, the docking station may transmit and receive data to multiple different controllers/CPUs. For instance, the operating instructions to the sampling device 3 may be received from a pre-programmed controller while the generated electrical signals may be transmitted to a separate computer for analysis. Despite the wide variety possible with the present invention, in most instances the communications network leading to the docking station 2 also does not have to be altered or reconnected when the sampling device 3 is replaced, which saves significant time and effort. The data communication connections may be wireless, part of a wired connection, or a combination of both.

Figure 2:
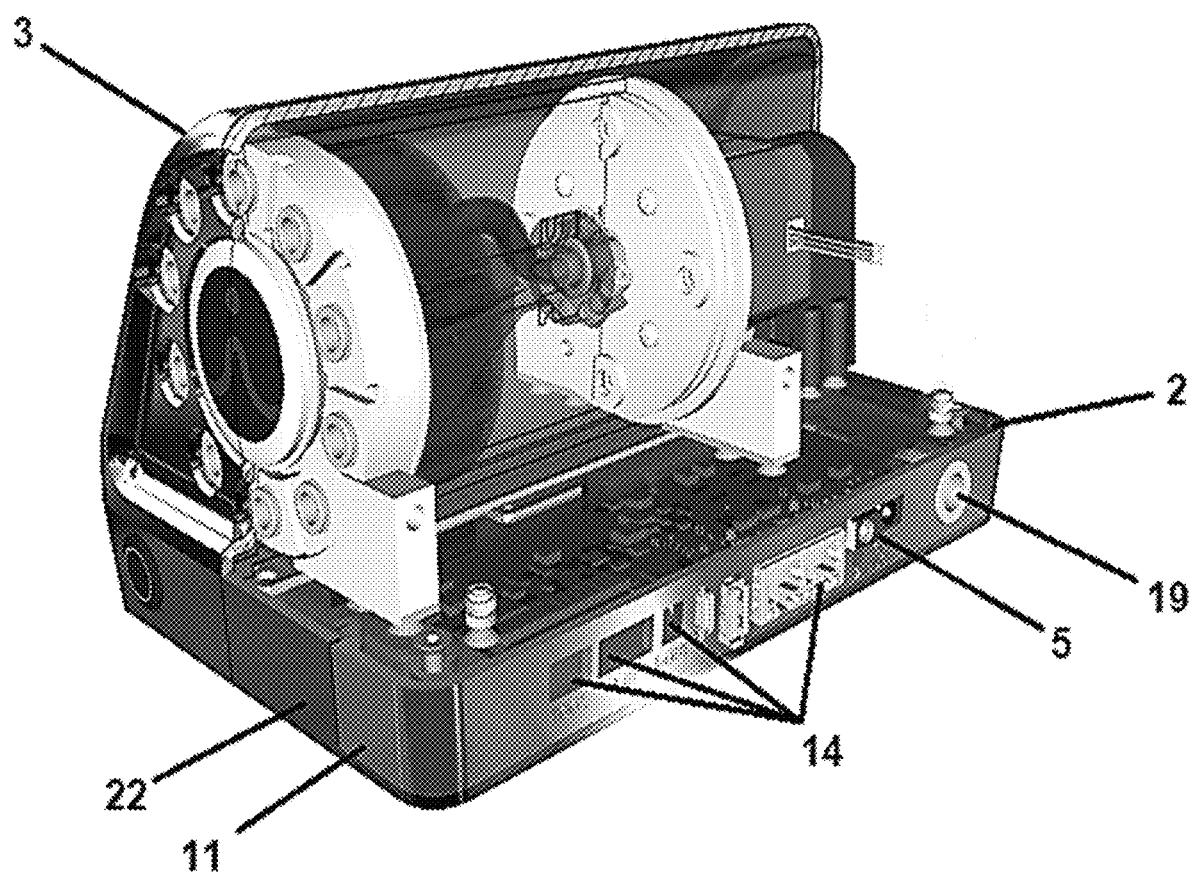
FIG. 2 shows a docking station in an embodiment of the present invention attached to a sampling manifold.

In an alternative embodiment, FIG. 2 shows a docking station 2 attached to a sampling device 3 (in this instance, a sampling manifold). In this embodiment, the docking station 2 is utilized with the sampling manifold to intake gas from multiple different locations and transport the sampled gas to a subsequent analyzer or particle counter. The specific sequence, timing, or locations to be sampled may be programmed and transmitted to the sampling manifold through the data ports 14. Alterations and changes to the sampling program, such as to take additional samples from a particular location, may also be transmitted through the data ports 14. Other alternative embodiments include an optical particle counter and a condensation particle counter (CPC) connected to the base; and an airborne molecular contamination monitor, a liquid particle counter, and a CPC simultaneously connected to the base. Other alternative embodiments include an optical particle counter and a condensation particle counter (CPC) connected to the base; and an airborne molecular contamination monitor, a liquid particle counter, and a CPC simultaneously connected to the base.

The power input 5 and data ports 14 are not located in the same position as the embodiment illustrated in FIG. 1, and may be repositioned according to the design specifications of the system. Additionally, this embodiment utilizes a vacuum connection 19 (utilizing negative pressure) to transport the fluid through the sampling device 3, and uses latches or fasteners 22 to physically attach the sampling device 3 to the base 11 of the docking station 2. Accordingly, the docking station 2 may be optimized for a specific sampling system. However, the docking station 2 may contain common elements, such as a universal power supply, allowing the docking station 2 to be used with multiple different sampling devices and in different sampling systems. The docking station 2 may also contain optional features that do not have to be used with every sampling device. For example, the same docking station may contain an ethernet port suitable for transmitting data in some sampling systems while also containing a wireless connector suitable for use in other sampling systems.

Figure 3:
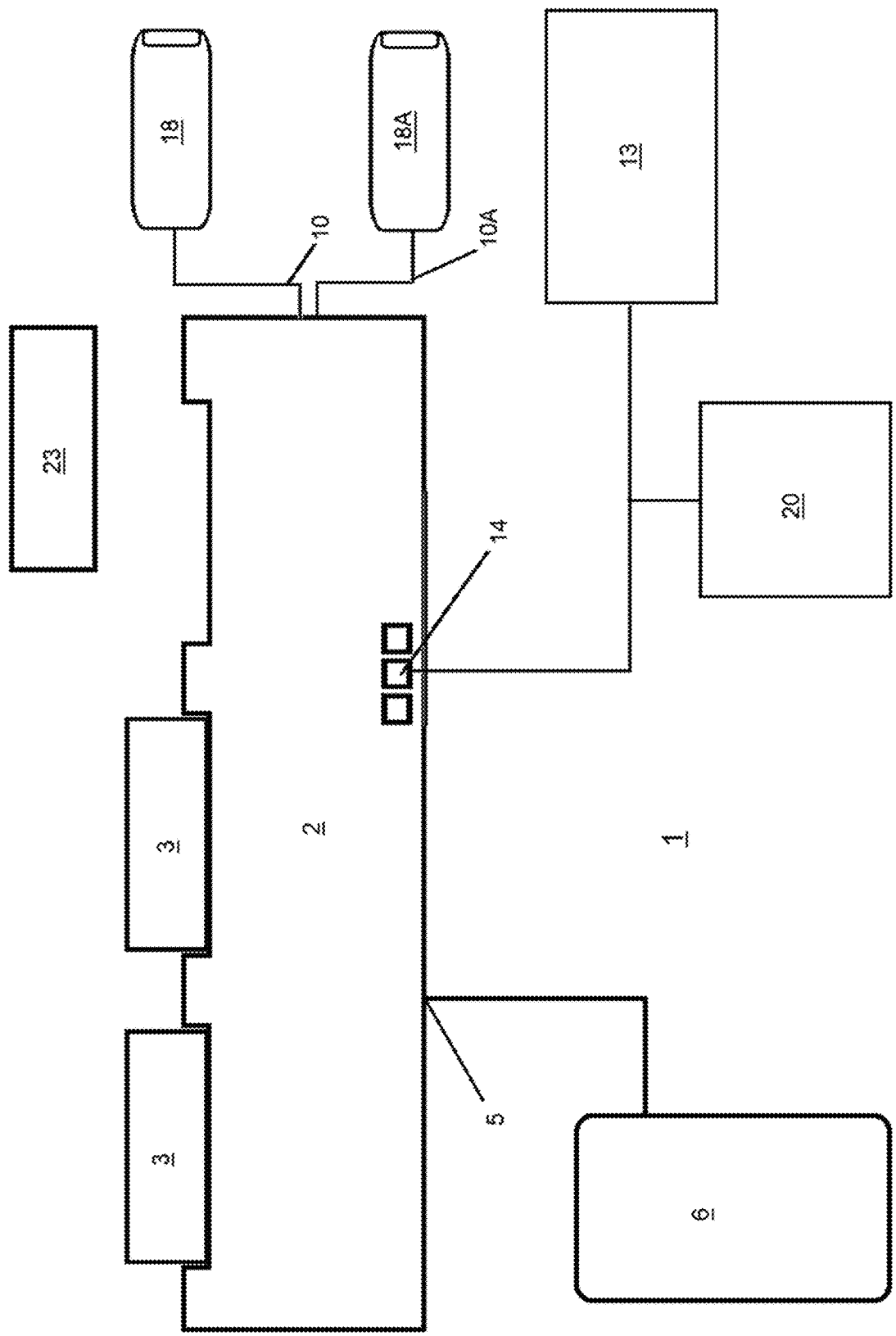
FIG. 3 shows a simplified illustration of an integrated fluid sampling system in an embodiment of the invention comprising a docking station attached to multiple sampling devices.

As illustrated in FIG. 3, a fluid sampling system 1 in one embodiment of the present invention comprises a docking station 2 that attaches to multiple sampling device 3 and may be used as a common component between the multiple sampling devices 3 and the other components of the fluid system 1. The docking station 2 provide the connections necessary to independently operate each of the multiple sampling devices 3, which may sample the same or different fluids through different fluid pathways (10 and 10A) and different secondary devices (18 and 18A). Each sampling device may be replaced independently from the other sampling devices by a second (or replacement) sampling device 23. The other components of the fluid system 1, such as the power supply 6 and controller/CPU 13 may remain the same, although the controller/CPU would be configured to operate the multiple sampling devices 3. FIG. 3 also illustrates the base connected to a graphical user interface (GUI) 20, which is able to display the operational status of one or more of the multiple sampling devices 3. A user may also select settings and control the operation of the multiple sampling devices 3 through GUI 20.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All references referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

We claim:

1. A docking station comprising:
   a) a base able to be removably attached to a body of one or more sampling devices;
   b) a secondary device connected to the base and able to sample gas from a target environment external to the docking station, wherein the one or more sampling devices and the secondary device are part of a gas sampling system able to transport the gas from the target environment external to the docking station, and wherein the one or more sampling devices are able to analyze or monitor the transported gas;
   c) a power supply having a power input able to be connected to a power source and having a power output, wherein the power output is able to provide power to operate the one or more sampling devices;
   d) at least one fluid connector able to be attached to a fluid system, wherein the fluid system is able to provide a positively or negatively pressurized fluid flow comprising the transported gas from the secondary device to or through the one or more sampling devices; and
   e) at least one data communications connector able to be connected to an external controller or a central processing unit (CPU), wherein the at least one data communications connector is able to transmit and receive electronic data to and from the external controller or CPU.

2. The modular docking station of claim 1 further comprising a detector or sensor able to detect or sense a one or more specific components, microorganisms, airborne molecular contaminants, or particles in the fluid flow.

3. The modular docking station of claim 1, wherein the at least one data communications connector comprises an analog input/output connection, a digital input/output connection, an ethernet switch connection, a wireless communication connection, or any combination thereof.

4. The modular docking station of claim 1 further comprising a computer processor, flash memory, computer memory, or data storage device.

5. The modular docking station of claim 4, wherein the computer processor, flash memory, or computer memory contains an internet protocol address and/or location setting of the one or more sampling devices.

6. The modular docking station of claim 4, wherein the computer processor, flash memory, or computer memory contains one or more operational settings for operating the one or more sampling devices, wherein the one or more sampling devices are removable and the one or more operational settings comprise location settings and calibration settings for one or more replacement sampling devices.

7. The modular docking station of claim 6, wherein the docking station comprises or is attached to an interface display system that is able to display an operational status of the one or more sampling devices and allow a user to select settings and control operation of the one or more sampling devices.

8. The modular docking station of claim 1, wherein the one or more sampling devices are able to perform continuous sampling from the external environment.

9. The modular docking station of claim 1, wherein the at least one fluid connector is a vacuum connecter and the fluid system comprises a vacuum source.

10. The modular docking station of claim 1, wherein the one or more sampling devices is a particle counter, condensation particle counter, gas or other fluid analyzer, particle analyzer, particle sampler, gas, air or liquid sampling manifold, molecular sampler, microorganism collection plate, microorganism collection impinger, real-time microbial detector, environmental or gas sensor, and combinations thereof.

11. The modular docking station of claim 1, wherein the power supply is a wireless power supply able to wirelessly provide power to one or more sampling devices.

12. A fluid sampling system comprising:
   a) one or more sampling devices and a secondary device, wherein the secondary device is able to sample a target fluid from an external environment, wherein the one or more sampling devices and the secondary device are part of a sampling system able to transport the sampled target fluid from the external environment to the one or more sampling devices, and wherein the one or more sampling devices are able to analyze or monitor the transported target fluid; and
   b) a modular docking station connected to the secondary device and removably attached to the one or more sampling devices, wherein the docking station comprises:
      i) a power supply having a power input connected to a power source and having a power output, wherein the power output is removably connected to the one or more sampling devices and provides power to operate the one or more sampling devices;
      ii) at least one fluid connector able to be attached to a fluid system, wherein the at least one fluid connector is removably connected to the one or more sampling devices and wherein the fluid system provides a positively or negatively pressurized fluid flow comprising the sampled target fluid from the secondary device to or through the one or more sampling devices; and
      iii) at least one data communications connector connected to an external controller or a central processing unit (CPU), wherein the at least one data communications connector transmits and receives electronic data to and from the external controller or CPU.

13. The fluid sampling system of claim 12, wherein the target fluid is sampled from a cleanroom, clean zone, or a clean environment.

14. The fluid sampling system of claim 12, wherein the target fluid is sampled from a pressurized gas.

15. The fluid sampling system of claim 12, wherein the one or more sampling devices is a particle counter, condensation particle counter, gas or other fluid analyzer, particle analyzer, particle sampler, gas, air or liquid sampling manifold, molecular sampler, microorganism collection plate, microorganism collection impinger, real-time microbial detector, environmental or gas sensor, and combinations thereof.

16. The fluid sampling system of claim 12, wherein the one or more sampling devices are able to perform continuous batch sampling, discrete sampling, or both.

17. The fluid sampling system of claim 16, wherein the docking station comprises or is attached to an interface display system that is able to display an operational status of the one or more sampling devices and allow a user to select settings and control operation of the one or more sampling devices, wherein the one or more sampling devices are removable and the selected settings comprise location settings and calibration settings for one or more replacement sampling devices.

18. The fluid sampling system of claim 12, wherein the power supply is a wireless power supply able to wirelessly provide power to the one or more sampling devices.

19. A method for operating a fluid sampling system comprising the steps of:
a) providing a first sampling device, a secondary device able to sample transport a target fluid comprising a gas from an external environment to the first sampling device, and a modular docking station connected to the secondary device and removably attached to the first sampling device, wherein the docking station comprises:
   i) a power supply having a power input connected to a power source and having a power output, wherein the power output is removably connected to the first sampling device and provides power to operate the sampling device;
   ii) at least one fluid connector able to be attached to a fluid system, wherein the fluid system is able to provide a positively or negatively pressurized fluid flow and transport the target fluid from the secondary device to or through the first sampling device, wherein the at least one fluid connector is removably connected to the first sampling device; and
   iii) at least one data communications connector connected to an external controller or a central processing unit (CPU), wherein the at least one data communications connector transmits and receives electronic data to and from the external controller or CPU;
b) sampling and analyzing or monitoring the target fluid from the secondary device using the first sampling device, wherein the target fluid comprises the gas from the external environment;
c) detaching the first sampling device from the docking station, power outlet and fluid connecter, and connecting a second sampling device to the docking station, power outlet and fluid connecter; and
d) sampling and analyzing or monitoring target fluid from the secondary device using the second sampling device, wherein the target fluid analyzed or monitored by the second sampling device comprises additional gas from the external environment.

20. The method of claim 19 further comprising detaching the second sampling device from the docking station, power outlet and at least one fluid connecter, and connecting a third sampling device to the docking station, power outlet and at least one fluid connecter; and sampling and analyzing or monitoring the target fluid from the secondary device using the third sampling device, wherein the target fluid analyzed or monitored the by the third sampling device comprises additional gas from the external environment, wherein target fluid from the external environment is continuously sampled by the first, second, and/or third sampling devices with minimal or no interruption.

21. The method of claim 19 further comprising generating data from the sampled fluid, operation of the sampling devices, or combinations thereof, and transmitting the generated data from the docking station to the external controller or CPU.

22. The method of claim 19, wherein the docking station further comprises a computer processor, flash memory, or computer memory containing an internet protocol address, location setting of the sampling device, one or more operational settings for operating the sampling devices, and combinations thereof.

23. The method of claim 19, wherein the sampling devices are particle counters, condensation particle counters, gas or other fluid analyzers, particle analyzers, particle samplers, gas, air or liquid sampling manifolds, molecular samplers, microorganism collection plates, microorganism collection impinger, real-time microbial detector, environmental or gas sensors, and combinations thereof.

24. The method of claim 19, wherein the docking station remains in substantially the same location during the sampling steps and detaching step.

25. The method of claim 19, wherein the docking station is positioned in a cleanroom, clean zone, or clean environment.

26. The method of claim 19, wherein the power supply is a wireless power supply able to wirelessly provide power to the sampling devices.

27. The modular docking station of claim 5, wherein the one or more sampling devices comprises a sampling manifold able to intake gas from multiple different locations external to the docking station and transport the gas to a detector or sensor, and wherein the computer processor, flash memory, or computer memory contains an internet protocol address and/or location setting for each sample location.

28. The modular docking station of claim 17, wherein the one or more sampling devices comprises a sampling manifold able to intake gas from multiple different locations external to the docking station and transport the gas to a detector or sensor.

29. The method of claim 22, wherein the one or more operational settings comprise calibration settings for one or more replacement sampling devices, and connecting a replacement sampling device to the docking station comprises operating the replacement device using the location setting and one or more operational settings.

* * * * *